July 25, 1961     K. KADELBURG     2,994,017
AIR-COOLED RECTIFIER ASSEMBLY
Filed Sept. 7, 1956     2 Sheets-Sheet 1
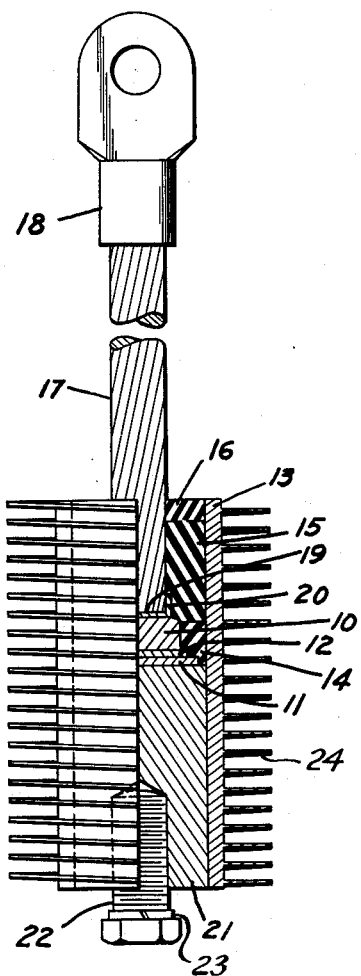
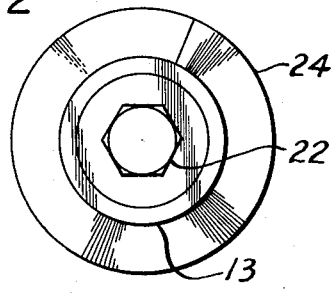
INVENTOR.
KURT KADELBURG
BY
*D. Gordon Angus*
ATTORNEY.

July 25, 1961  K. KADELBURG  2,994,017
AIR-COOLED RECTIFIER ASSEMBLY
Filed Sept. 7, 1956  2 Sheets-Sheet 2

INVENTOR.
KURT KADELBURG
BY
ATTORNEY.

United States Patent Office 2,994,017
Patented July 25, 1961

2,994,017
AIR-COOLED RECTIFIER ASSEMBLY
Kurt Kadelburg, Los Angeles, Calif., assignor to International Rectifier Corporation, El Segundo, Calif., a corporation of California
Filed Sept. 7, 1956, Ser. No. 608,634
6 Claims. (Cl. 317—234)

This invention relates to dry rectifiers and more particularly to an improved means for dissipating heat generated during a period of rectification in a dry rectifier.

This is a continuation-in-part of my co-pending application Serial Number 498,880, filed April 4, 1955, now abandoned.

It has been a problem in the past that whenever large amounts of current are to be rectified some means must usually be employed for dissipating the heat generated. Rectification of the high current also requires sturdy construction which should be flexible enough to allow freedom of use in actual application.

I overcome these difficulties in accordance with my present invention by provision of a rectifying element located within an enclosure. Surrounding the periphery of the enclosure I provide a fin arrangement in a heat-conducting relationship with the rectifying element so that heat may travel to the fin which is cooled by air circulation.

In one embodiment of my invention, I have placed a germanium rectifier within a tubular enclosure. One end of the enclosure is sealed with insulating composition through which passes a terminal lead, and the opposite end is plugged and attached to a terminal. Encircling the enclosure is a fin.

According to another embodiment, the terminal lead is held within a sleeve which extends within the tubular enclosure.

This feature of construction permits the heat generated by the rectifier to pass through the plug and enclosure tube to the encircling fin.

This invention will be described with reference to the accompanying drawings in which:

FIG. 1 is a partial sectional view of a rectifier unit in accordance with the present invention;

FIG. 2 is an end view of the unit of FIG. 1;

Figure 3:
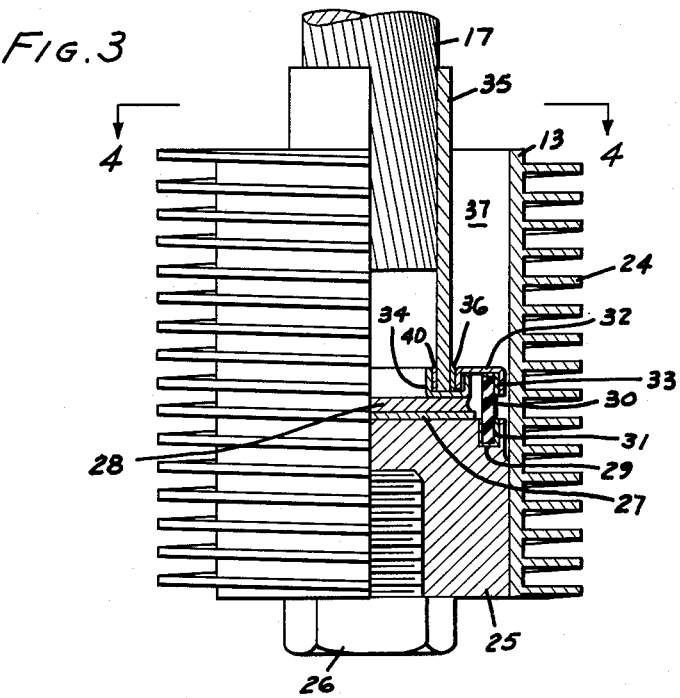
FIG. 3 is a partial cross sectional view of another rectifier unit in accordance with this invention.

Referring to the invention shown in FIGS. 1 and 2, a rectifier unit is provided comprising electrode 10 composed of a pellet, preferably of indium, and a base plate 11 soldered to opposite sides of a germanium wafer 12. These rectifier elements are fixed within a tubular enclosure 13, preferably of copper.

The rectifier unit is sealed within the tube by suitable sealing material. There is a considerable choice of such sealing materials available. I prefer, however, to pour or apply a layer of a suitable resin 14, such as polyisobutylene, immediately around the rectifier unit; and on top of this resin, I prefer to pour a wax or wax-like substance 15 such as zopher wax. It is sometimes found advantageous to introduce a layer of a silicone (not shown) between layers 14 and 15. I prefer to seal in these substances with a layer of a paste-like substance 16, such as an epoxy paste or resin. These fillers serve as insulators between the enclosure and a negative terminal lead 17 which passes through the fillers beyond the end of the enclosure. The terminal lead itself is flexible and has attached to its free end a terminal lug 18. The terminal lead is attached to the indium pellet by means of a cable butt plate 19 and collar 20 arrangement. The terminal lead may be affixed to the plate and collar by any conventional method of crimping while the plate is affixed to the indium pellet by a soldering method.

The opposite end of the enclosure is sealed with a base plug 21, preferably of copper, into which a positive terminal bolt 22 is inserted; and the terminal bolt is preferably provided with a lock washer 23. In FIG. 1, the bolt 22 is shown as not turned all the way into the plug. The base plug itself is preferably shrunk-fit into the enclosure. The base plate of the germanium is affixed to the copper base plug by any suitable adhering means, such as solder.

A spiral fin 24 is formed around the periphery of the enclosure along its longitudinal axis; and this fin is preferably extruded from the enclosure. The construction of such a fin provides more surface area exposed to the free air in which to dissipate heat than a conventional rectifier having a plurality of individual fins placed adjacent each other. It will be understood, however, that some other form of fin could be used instead, such as individual parallel fins placed side by side.

The cooling fin is formed so as to absorb heat generated by the rectifying element during operation. The fin means is in heat conductive contact with the enclosure, and fixed to the periphery thereof. Since the enclosure and fin are composed of copper or other heat conductive material, heat is easily absorbed and transferred via the enclosure to the fin. Air circulation serves to cool the fin by removing any accumulated heat radiating from its broad surface.

The flexible terminal lead and its associated lug serve as a convenient connecting means for attachment in a circuit carrying high current. The terminal bolt also serves as a convenient connecting means for use in a circuit. This sturdy construction allows flexibility of use in connecting the rectifier in a circuit.

Figure 4:
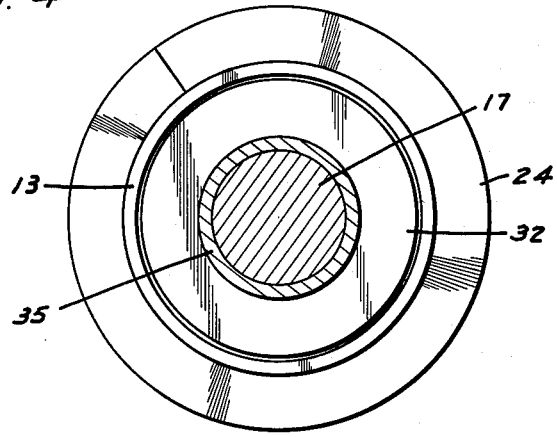
FIG. 4 is a cross-section view taken at line 4—4 of FIG. 3.

In the embodiment of FIGS. 3 and 4, there is shown a plug or base 25 relatively shorter than the plug 21 of FIG. 1; and the plug 25 will preferably be of copper and shrunk or soldered within the tubular enclosure 13, as in FIG. 1. The terminal bolt 26 corresponds to the bolt 22 of FIG. 1. The spiral fin 24 is the same construction as the same numbered fin in FIG. 1.

A germanium wafer 27 is soldered on the upper surface of the base plug 25, and a pellet 28, preferably of indium, is soldered on the upper surface of the germanium wafer. The base plug 25 is provided with an annular groove 29 near its circumference; and within this groove there is set the lower edge of a cylindrical collar 30 of insulating material, preferably a ceramic material, which can be held in place within the groove by solder 31.

The edge of the collar 30 opposite from the end which is set within the groove 29, has attached to it a collar ring 32 which can be a metal such as nickel, having the cross section of an inverted U. It is fastened to the ceramic by solder 33.

A metallic U ring member 34 having a U shaped cross section, is placed on top of the indium pellet with the base of the U in surface contact with the indium.

This U-ring 34 provides an internal annular groove as shown.

The inner wall of member 32 is set within the outer wall of the U ring 34. The collar ring 32 and the U-ring 34 each have a generally U-shaped cross-section with an inner and an outer flange. The outer flange of the collar ring is hooked over the collar and its inner flange is hooked over the outer flange of U-ring 34.

A metal cylindrical sleeve 35 preferably of copper has its lower ends set within the groove of the ring 34, between the inner flanges of rings 32 and 34, and is soldered in place by solders 40 and 36, the solder 36 serving to attach the sleeve 35 to the member 32.

In assembling the unit, the germanium and indium members will be mounted on the copper base plug 25 as shown, and the plug fitted into the tube 13. The sleeve 35 can be soldered to the U ring 34 by the solder 40 as a pre-soldering operation; and for this reason solder 40 is preferably a relatively high temperature melting solder. The elements 30 and 32 can be soldered together by the solder 33 as pre-soldering operation; so that solder 33 should also preferably by a relatively high temperature solder. The unit is then ready for final assembly which can be accomplished by inserting the collar 30 into the groove 29 and using a solder 31 which melts at a relatively lower temperature than the solder 33. Similarly, the solder 36 should be a relatively low temperature solder as compared with solders 40 and 33. The assembly will thereby be completed.

The terminal or cable 17 can then be inserted within sleeve 35 at convenient distance and the sleeve 35 can be crimped circumferentially around the cable 17 to secure it in place and make good electrical contact. Any deformation which sleeve 35 may undergo in crimping is not shown in the drawing. By this assembly, the metallic sleeve 35 is held in secure electrical contact with the indium pellet 28 which will serve to connect it electrically with the cable 17.

In the embodiment of FIGS. 3 and 4, no wax or other filler need be placed into the space 37 between members 13 and 35.

In both embodiments illustrated in the drawing, the germanium on its base plate or member acts as the semi-conductor of the rectifier and the indium pellet as a counterelectrode. Thus the terminal bolt (22 or 26) acts as one rectifier terminal while the cable 17 acts as the lead for the other terminal.

It will be recognized that modifications may be made within the scope of this invention. For example, some metal other than indium could be used for the counterelectrode; and a semi-conductor material other than germanium could be used for the semi-conductor of the rectifier.

The foregoing description and the drawing are given by way of illustration rather than by way of limitation, and the invention is not limited except within the scope of the appended claims.

I claim:

1. A rectifier assembly comprising in combination, a rigid hollow enclosure, a metallic base within the enclosure, a metallic rectifying element mounted on the base and located within the enclosure, fin means formed around the periphery of the enclosure and in heat-conducting relationship with the enclosure and the rectifying element, an electrical insulator fastened to the base within the enclosure, an electrically conductive sleeve fastened to the insulator and in electrically conductive relationship with the rectifying element, the rectifying element being disposed between its contacts with the base and the sleeve, and an electrical terminal cable fastened within the sleeve.

2. A rectifier assembly comprising in combination, a rigid hollow enclosure, a metallic base within the enclosure, a metallic rectifying element mounted on the base and located within the enclosure, fin means formed around the periphery of the enclosure and in heat-conducting relationship with the enclosure and the rectifying element, a collar of electrical insulating material around the rectifying element within the enclosure and having an edge fastened to the base, grooved means fitted to the other edge of said collar, said grooved means being in electrical contact with the side of said rectifying element remote from the base, an electrically conductive sleeve having an edge fastened to the grooved means, and an electrical terminal cable fastened within the sleeve.

3. A rectifier assembly comprising in combination, a rigid tubular enclosure, a metallic plug fitted within the tubular enclosure, a semi-conductor material mounted on the plug and located within the enclosure, a counterelectrode in contact with the semi-conductor material, said plug containing an annular groove, a cylindrical collar of electrical insulating material having an edge secured within said groove, grooved means fastened to the other edge of said collar, said grooved means being in electrical contact with said counterelectrode, an electrically conductive sleeve secured to said grooved means, and an electrical terminal cable fitted within said sleeve, there being an air space within the enclosure between the enclosure and the sleeve.

4. A rectifier according to claim 3 in which the semi-conductor is germanium and the counterelectrode is indium.

5. A rectifier according to claim 4 in which a fin means is located around the periphery of the enclosure and in heat-conducting relationship with the enclosure and the germanium.

6. A rectifier according to claim 3 in which said grooved means comprise a collar ring and a U ring, both of said rings having a generally U-shaped cross-section with an inner and outer flange, the outer flange of the collar ring being hooked over the collar and its inner flange being hooked over the outer flange of the U-ring, said sleeve being inserted between the inner flanges of said rings.

References Cited in the file of this patent

UNITED STATES PATENTS

| | | |
|---|---|---|
| 1,997,844 | Wiegand | Apr. 16, 1935 |
| 2,042,542 | Masnov | June 2, 1936 |
| 2,735,050 | Armstrong | Feb. 14, 1956 |
| 2,751,528 | Burton | June 19, 1956 |
| 2,752,541 | Losco | June 26, 1956 |
| 2,763,822 | Frola et al. | Sept. 18, 1956 |
| 2,862,158 | Stelmak et al. | Nov. 25, 1958 |

FOREIGN PATENTS

| | | |
|---|---|---|
| 1,119,805 | France | Apr. 9, 1956 |